CATHODE RAY TUBE SYSTEM

Filed Feb. 27, 1959 2 Sheets-Sheet 1

INVENTOR.
JACK B. HARVEY
BY Alfred C. Hill
AGENT

INVENTOR.
JACK B. HARVEY

BY Alfred C. Hill

AGENT

United States Patent Office 2,993,142
Patented July 18, 1961

2,993,142
CATHODE RAY TUBE SYSTEM
Jack B. Harvey, Clifton, N.J., assignor to International Telephone and Telegraph Corporation, Nutley, N.J., a corporation of Maryland
Filed Feb. 27, 1959, Ser. No. 796,150
9 Claims. (Cl. 315—22)

Figure 1:
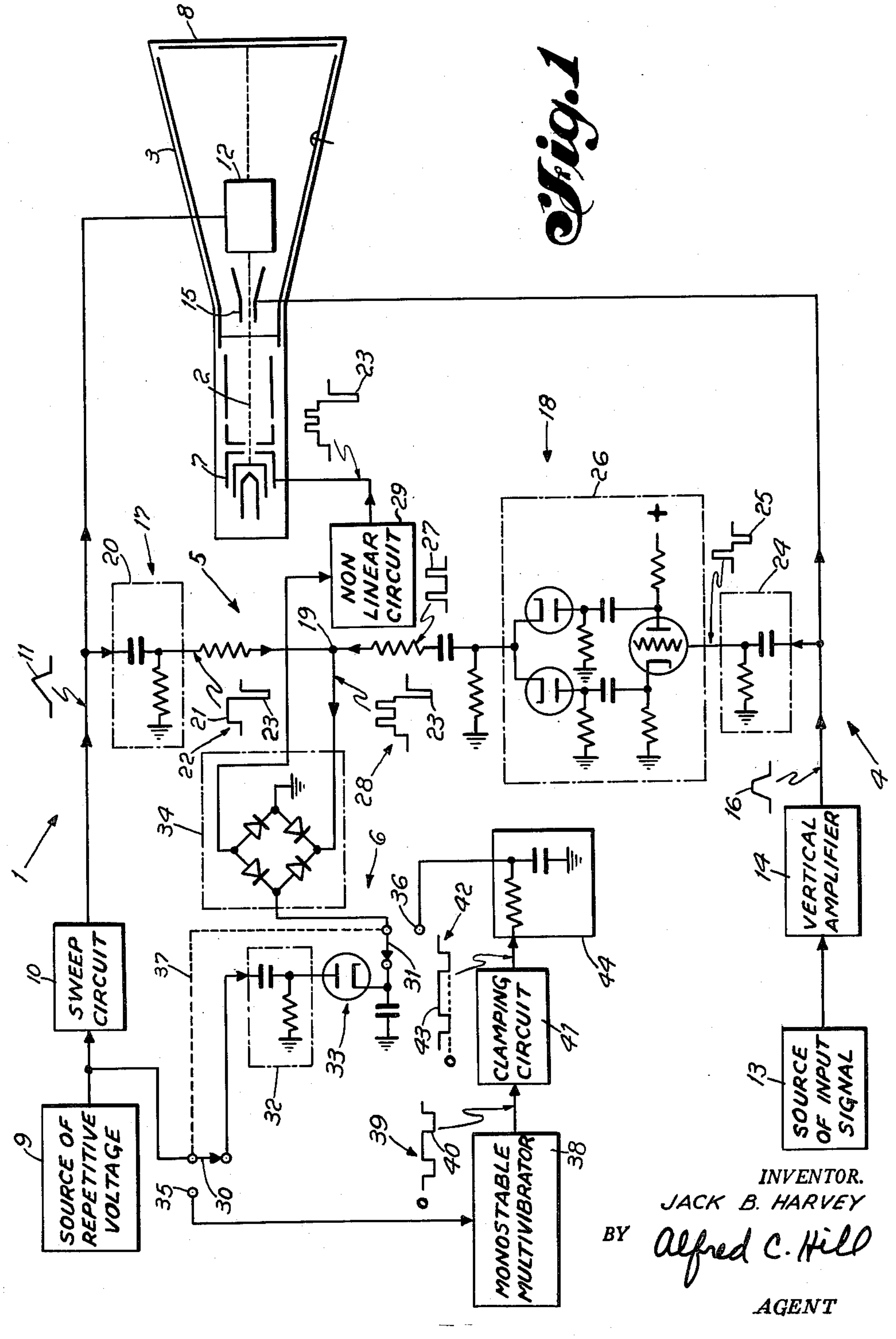

The present invention relates to cathode ray tube systems and more particularly to a cathode ray tube intensity control system.

The brightness of a cathode ray tube trace is inversely proportion to electron beam (spot) velocity and may be expressed approximately as:

$$B=\frac{KF}{\sqrt{V_v^2+V_h^2}}$$

where: B=brightness, K=proportionality constant, F=sweep repetition frequency, $V_v$=vertical component of electron beam (spot) velocity, and $V_h$=horizontal component of electron beam (spot) velocity. When the sweep speed is changed, or when short pulses or long pulses with a short rise time are viewed, the brightness or intensity of the trace will not remain constant thereby causing portions of the trace to be very faint with respect to other portions.

Therefore, an object of the present invention is to provide a cathode ray tube intensity control system to eliminate the problem set forth hereinabove.

Another object of the present invention is to provide a cathode ray tube with a substantially constant intensity luminous trace.

Still another object of the present invention is to automatically control the intensity of the electron beam of a cathode ray tube to compensate for changes in the horizontal and/or vertical velocity of the electron beam and/or for changes in the sweep repetition frequency.

A further object of the present invention is to produce signals proportional to variations in the variable parameters (F, $V_v$ and $V_h$) of the above equations to compensate for changes in these parameters to thereby control the intensity of the electron beam to maintain a substantial constant intensity luminous trace.

A feature of the present invention is the provision of a cathode ray tube intensity control system cooperating with the deflection systems of the cathode ray tube including means for producing a control signal proportional to the resultant velocity of the deflection of the electron beam of the cathode ray tube and means to couple said control signal to the intensity grid of the cathode ray tube.

Another feature of the present invention is the provision of a cathode ray tube intensity control system cooperating with the deflection systems of the cathode ray tube including means for producing a control signal proportional to the resultant velocity of the deflection of the electron beam, means for adjusting said control signal in accordance with the repetition frequency of the signal of one of said deflection systems and means to couple the adjusted control signal to the intensity grid of the cathode ray tube.

Still another feature of the present invention is the provision of differentiating circuits and a full-wave rectifier arranged in a particular cooperative organization with respect to the horizontal and vertical deflection systems of a cathode ray tube to produce a control signal proportional to the resultant velocity of the deflection of the electron beam.

A further feature of the present invention is the provision of a potentiometer arranged to adjust the control signal proportional to the resultant beam velocity in accordance with the sweep repetition frequency when said sweep repetition frequency is constant.

Still a further feature of the present invention is the provision of a frequency responsive circuit arranged to automatically produce a signal inversely proportional to the sweep repetition frequency to adjust the control signal proportional to the resultant beam velocity in accordance therewith both when said sweep repetition frequency is constant or when said sweep repetition frequency varies.

Figure 2:
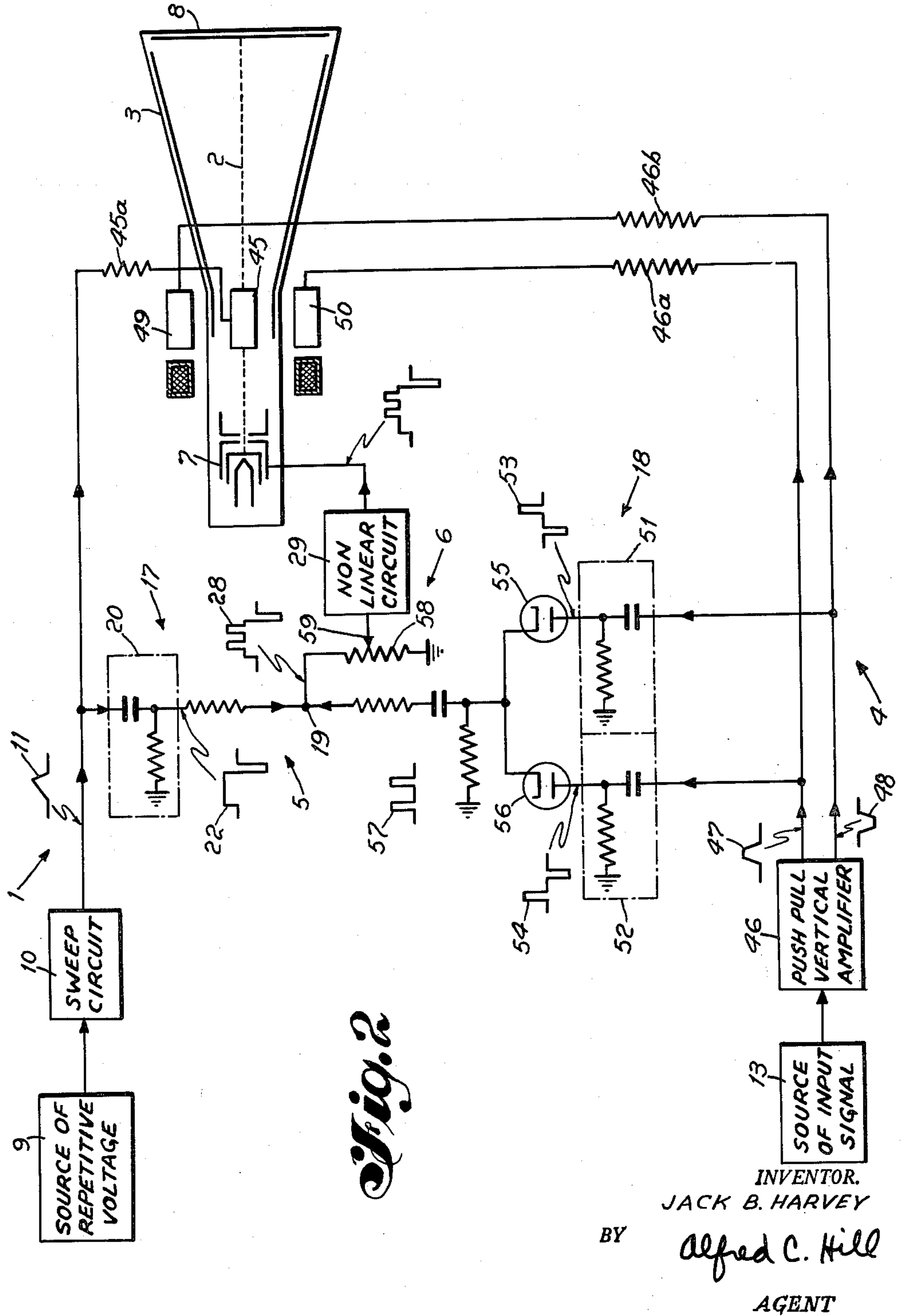

The above mentioned and other features and objects of this invention will become more apparent by reference to the following description taken in conjunction with the accompanying drawings, in which:

FIG. 1 is a schematic diagram, partially in block form, of a cathode ray intensity control system following the principles of this invention; and FIG. 2 is a schematic diagram, partially in block form, illustrating another embodiment of the present invention.

Referring to FIG. 1, there is illustrated an illustrative cathode ray tube system including at least a first deflection system 1 to deflect the electron beam of cathode ray tube 3 in a first direction and a second deflection system 4 to deflect the electron beam 2 in a second direction orthogonally related to said first direction. The intensity control system of this invention incorporated in this illustrative cathode ray tube system is basically illustrated as including network 5 coupled to deflection systems 1 and 4 responsive to the voltages thereof to produce a control signal proportional to the resultant velocity of the deflection of electron beam 2 and network 6 coupled to network 5 to adjust the control signal at the output thereof in accordance with the repetition frequency of the signal of one of deflection systems 1 and 4. This adjusted control signal is coupled to intensity grid 7 of cathode ray tube 3 to adjust the intensity of electron beam 2 to produce a substantially constant intensity trace on face 8 of cathode ray tube 3 regardless of variations in the rate of change of the voltages of deflection systems 1 and 4.

In accordance with the illustration of FIG. 1, deflection system 1 includes a source of repetitive voltage 9 which triggers the usual sweep circuit 10 to provide a repetitive sweep waveform 11 for application to horizontal deflection plates 12 thereby causing electron beam 2 to be swept periodically across the face 8 of tube 3 in a horizontal direction. The periodic rate of the sweep output of circuit 10 is controlled by repetition rate of the voltage of source 9. Deflection system 4 is illustrated as including a source of input signal 13 whose wave shape it is desired to display on face 8 of tube 3. The output of source 13 is amplified by amplifier 14 prior to application to the vertical deflection plates 15 of tube 3 to deflect electron beam 2 in a vertical direction across face 8 to a height proportional to the magnitude of the input signal of source 13 and at a rate proportional to the rate of change of the input signal. A typical wave shape that may be present in deflection system 4 is illustrated by curve 16 at the output of amplifier 14.

Network 5 is illustrated as including networks 17 and 18 to respectively produce a voltage proportional to the velocity of the horizontal deflection of electron beam 2 and a voltage proportional to the velocity of the vertical deflection of electron beam 2. The outputs of circuits 17 and 18 are combined at point 19 to provide a composite waveform to adjust the density of the electron beam in accordance with the resultant electron beam deflection velocity so that a substantially constant intensity trace is produced on face 8 of tube 3.

Network 17 more specifically may include a differentiator 20 to differentiate the sweep waveform 11 to produce a control signal proportional to the velocity of the horizontal deflection of beam 2 as illustrated in waveform 22 including pulse 21 having a height proportional to the sweep velocity and a pulse 23 during the retrace portion of waveform 11 to aid in blanking the electron beam of cathode ray tube 3 during the retrace period. Network 18 more specifically includes differentiator 24 to differentiate waveform 16 thereby resulting in waveform 25. By passing waveform 25 through full-wave rectifier 26, a control signal proportional to the velocity of the vertical deflection of beam is produced as illustrated in waveform 27. It should be noted that waveform 27 is positive for both upward and downward velocities. This is necessary since as illustrated in the equation for brightness, the velocities are squared terms and therefore will always have a positive polarity. The control signals of waveforms 22 and 27 are combined by addition at point 19 to produce a resultant control signal, as illustrated in waveform 28, proportional to the resultant deflection of electron beam 2 across face 8.

Point 19 could be connected directly to intensity grid 7 through non-linear circuit 29 and waveform 28 would provide an improvement in the intensity of the displayed waveform.

However, it has been found to be advantageous to adjust the composite waveform 28 by network 6 in accordance with the repetition frequency of the sweep circuit 10 prior to coupling waveform 28 to non-linear circuit 29. This adjustment will substantially eliminate any variation in intensity of the displayed waveform. Non-linear circuit 29 is employed to distort wave form 28 to compensate for the non-linear transfer characteristic (voltage to brightness) of the intensity grid 7 of tube 3. In most instances the non-linear characteristic of circuit 29 may follow approximately a square law. However, it is to be remembered that the characteristic must compensate for the non-linear transfer characteristic of grid 7 regardless of the shape it may take.

Network 6 may take several forms two of which are illustrated in FIG. 1. When switches 30 and 31 are in the position illustrated in FIG. 1, network 6 includes a low-pass filter 32 connected to the output of source 9 and a rectifier 33 to produce a current (signal) inversely proportional to the repetition frequency of source 9, or in other words, the repetition frequency of the sweep or horizontal deflection voltage. The output current is coupled to modulator 34, illustrated to be of the bridge type. The composite waveform at point 19 is also coupled to modulator 34 to be adjusted by the signal at the output of rectifier 33. This automatic adjustment on the composite waveform 28 in accordance with repetition frequency of the horizontal or sweep deflection system becomes a relative important component of the intensity control circuit system of this invention where the sweep circuit is triggered by a source of sinusoidal voltage which varies in frequency such as may occur when observing distortion in audio and radio frequency amplifiers as a function of frequency.

When switches 30 and 31 are moved to terminals 35 and 36 by mechanical linkage 37, another form of network 6 is placed into its proper co-operative relationship with the remainder of the system. The output of source 9 triggers monostable multivibrator 38 into operation to produce waveform 39. The time constant of multivibrator 38 is selected to produce pulses 40 whose width is equal to the period of the sweep circuit. The time spacing between pulse 40 will depend on the repetition frequency of the output of source 9, the spacing will decrease as the frequency increases and will increase as the frequency decreases. The output of multivibrator 38 is coupled to clamping circuit 41 to shift the zero level of waveform 39 from that illustrated to that illustrated in conjunction with waveform 42 thereby providing a positive pulse 43 whose width is inversely proportional to the repetition frequency of the sweep deflection circuit 1.

The output of clamping circuit 41 is coupled to an integrator 44 to produce a signal proportional to the width of pulse 43 and hence inversely proportional to the repetition frequency of the voltage of source 9, the sweep voltage repetition rate. This output signal of integrator 44 is coupled to modulator 34 to adjust the voltage of waveform 28.

Each of the networks 7, described in detail hereinabove, produce a bias signal whose amplitude is inversely proportional to the repetition frequency of the voltage of source 9, the sweep voltage repetition frequency, for application to modulator 34 to adjust waveform 28. If the repetition frequency of source 9 is constant, networks 6 will produce a constant bias signal for modulator 34. If the repetition frequency of source 9 varies, networks 6 will produce varying bias signals to thereby continuously adjust waveform 28.

Referring to FIG. 2, an arrangement of the intensity control system of this invention is illustrated to demonstrate the versatility of this invention. In the discussion of FIG. 2, components which are identical with those described in FIG. 1 will carry the same reference numerals. Deflection system 1 of FIG. 2 is identical to that described in connection with FIG. 1, except that horizontal magnetic deflection coils 45 are employed rather than electrostatic plates 12. Since magnetic deflection coils are responsive to current rather than voltage resistors 45*a*, 46*a* and 46*b*, are included in the deflection systems to provide deflection current signals for the magnetic coils. Deflection system 4 of FIG. 2 is different than that of FIG. 1 in that the input signal of source 13 is applied to a push-pull type vertical amplifier 46. The outputs (waveforms 47 and 48) of push-pull amplifier 46 are coupled to the vertical magnetic deflection coils 49 and 50 in a push-pull manner.

The intensity control circuit of this invention included in the environment briefly outlined hereinabove includes network 5 to produce a control signal proportional to the resultant velocity of the deflection of electron beam 2 and a network 6 to adjust said control signal in accordance with the repetition frequency of the signal of one of the deflection systems; namely, the horizontal deflection system. As in the case in FIG. 1, network 5 broadly includes network 17 to produce a control signal proportional to the velocity of the horizontal deflection of the electron beam and network 18 to produce a control signal proportional to the velocity of the vertical deflection of the electron beam. The specific circuitry of network 17 is identical to that of FIG. 1 and includes a differentiator 20 to produce waveform 22 which include a portion proportional to the velocity of the horizontal deflection of the electron beam. Network 18 when incorporated in a push-pull arrangement has a slightly different specific configuration than illustrated in FIG. 1. As illustrated in FIG. 2, network 18 includes a differentiator 51 coupled to one output of amplifier 46 and a differentiator 52 coupled to the other output of amplifier 46 to produce voltages having the configuration illustrated in waveforms 53 and 54, respectively. The outputs of differentiators 51 and 52 are coupled respectively to diodes or rectifiers 55 and 56 to pass only the positive portions of waveforms 53 and 54 to a common output. This results in a control signal proportional to the velocity of the vertical deflection of the electron beam as illustrated in waveform 57. It will be noted that waveform 57 and 27 are identical. Waveform 57 produced from the push-pull arrangement of the intensity control circuit of this invention is combined with waveform 22 at point 19 thereby providing a composite waveform 28 proportional to the resultant velocity of the deflection of the electron beam 2 across face 8 of tube 3.

In the arrangement of FIG. 2, network 6 employed to adjust the composite waveform 28 in accordance with the repetition frequency of source 9 is illustrated as including potentiometer 58 to which the resultant waveform at point 19 is coupled. Arm 59 of potentiometer 58 is adjusted manually in accordance with a constant repetition frequency of the voltage of source 9 to thereby properly adjust the composite control signal at point 19 to produce a substantially constant intensity trace on face 8 of tube 3. The adjusted composite control signal at arm 59 is coupled to non-linear circuit 29, as in the case of FIG. 1, for application to the intensity grid 7 of tube 3 to control the trace on face 8 to have a substantially constant intensity in all portions thereof.

The specific arrangements of the intensity control circuit of this invention illustrated in FIGS. 1 and 2 are for the purposes of explanation. It is to be understood that the push-pull arrangement of FIG. 2 may be incorporated in the arrangement of FIG. 1, that the network 6 of FIG. 2 may be incorporated in the arrangement of FIG. 1, that the networks 6 of FIG. 1 may be incorporated in the arrangement of FIG. 2, and that any of the components of the arrangements illustrated in FIGS. 1 and 2 are completely interchangeable one with the other and may be incorporated with either electrostatic or magnetic deflection cathode ray type tubes.

While I have described the principles of my invention in connection with specific apparatus, it is to be clearly understood that this description is made only by way of example and not as a limitation to the scope of my invention as set forth in the objects thereof and in the accompanying claims.

I claim:

1. A cathode ray tube system comprising a cathode ray tube having at least a first deflection system to deflect the electron beam of said cathode ray tube, a second deflection system to deflect the electron beam of said cathode ray tube, and an intensity grid, a first and second source of signals, means coupling said first source to said first deflection system, means coupling said second source to said second deflection system, means responsive to the repetition frequency of the signal of one of said deflection systems to produce a voltage inversely proportional with the said repetition frequency, and means coupled to said responsive means to apply said voltage to said intensity grid.

2. A cathode ray tube system comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, a first and second source of voltage, means coupling said first source to said horizontal deflection system, means coupling said second source to said vertical deflection system, a low-pass filter coupled to said horizontal deflection system, a rectifier coupled to the output of said filter, said filter and said rectifier cooperating to produce a signal inversely proportional to changes in the repetition frequency of the voltage of said horizontal deflection system, and means to couple said rectifier to said intensity grid to adjust the potential of said intensity grid inversely with the changes in repetition frequency of the voltage of said horizontal deflection system.

3. A cathode ray tube system comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, a first and second source of voltage, means coupling said first source to said horizontal deflection system, means coupling said second source to said vertical deflection system, a multivibrator coupled to said horizontal deflection system responsive to the repetition frequency of the voltage thereof, a clamping circuit coupled to the output of said multivibrator, an integrator coupled to the output of said clamping circuit to produce a signal inversely proportional to changes in the repetition frequency of the voltage of said horizontal deflection system, and means to couple said integrator to said intensity grid to adjust the potential of said intensity grid inversely with the changes in repetition frequency of the voltage of said horizontal deflection system.

4. A cathode ray tube system of the type described comprising a cathode ray tube having at least a first deflection system to deflect the electron beam of said cathode ray tube for movement in a first path, a second deflection system t odeflect the electron beam of said cathode ray tube for movement in a second path, and an intensity grid, means coupled to said first and second deflection systems responsive to the voltages thereof to produce a control signal proportional to the resultant velocity of the deflection of said electron beam, means coupled to said control signal producing means to adjust said control signal in accordance with the changes in repetition frequency of the signal of one of said deflection systems, and means coupled to said adjustment means to couple said adjusted control signal to said intensity grid.

5. A cathode ray tube system of the type described comprising a cathode ray tube having at least a first deflection system to deflect the electron beam of said cathode ray tube for movement in a first path, a second deflection system to deflect the electron beam of said cathode ray tube for movement in a second path, and an intensity grid, means coupled to said first and second deflection systems responsive to the voltages thereof to produce a control signal proportional to the resultant velocity of the deflection of said electron beam, frequency responsive means coupled to one of said deflection systems to produce a signal inversely proportional to changes in the repetition frequency of the voltage thereof, means coupled to said control signal producing means and said frequency responsive means to adjust said control signal in accordance with the signal output of said frequency responsive means and means coupled to said adjustment means to couple said adjusted control signal to said intensity grid.

6. A cathode ray tube system of the type described comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, means coupled to said horizontal and vertical deflection systems responsive to the voltages thereof to produce a control signal proportional to the resultant velocity of the deflection of said electron beam, a frequency responsive means coupled to one of said deflection systems to produce a signal inversely proportional to changes in the repetition frequency of the voltage thereof, means coupled to said control signal producing means and said frequency responsive means to adjust said control signal in accordance with signal output of said frequency responsive means, and means coupled to said adjustment means to couple said adjusted control signal to said intensity grid.

7. A cathode ray tube system of the type described comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, means coupled to said horizontal and vertical deflection systems responsive to the voltages thereof to produce a control signal proportional to the resultant velocity of the deflection of said electron beam, a frequency responsive means coupled to said horizontal deflection system to produce a signal inversely proportional to changes in the repetition frequency of the voltage thereof, means coupled to said control signal producing means and said frequency responsive means to adjust said control signal in accordance with the signal output of said frequency responsive means, and means coupled to said adjustment means to couple said adjusted control signal to said intensity grid.

8. A cathode ray tube system of the type described comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, means coupled to said horizontal and vertical deflection systems responsive to the voltages thereof to produce a control signal proportional to the resultant velocity of the deflection of said electron beam, a low-pass filter coupled to said horizontal deflection system, a rectifier coupled to the output of said filter, said filter and said rectifier cooperating to produce a signal inversely proportional to changes in the repetition frequency of the voltage of said horizontal deflection system, means coupled to said control signal producing means and said rectifier to adjust said control signal in accordance with the signal output of said rectifier, and means coupled to said adjustment means to couple said adjusted control signal to said intensity grid.

9. A cathode ray tube system of the type described comprising a cathode ray tube having at least a horizontal deflection system to deflect the electron beam of said cathode ray tube in a horizontal direction, a vertical deflection system to deflect the electron beam of said cathode ray tube in a vertical direction, and an intensity grid, means coupled to said horizontal and vertical deflection systems responsive to the voltages thereof to produce a control signal proportional to the resultant velocity of the deflection of said electron beam, a multivibrator coupled to said horizontal deflection system responsive to the repetition frequency of the voltage thereof, a clamping circuit coupled to the output of said multivibrator, an integrator coupled to the output of said clamping circuit to produce a signal inversely proportional to changes in the repetition frequency of the voltage of said horizontal deflection system, means coupled to said control signal producing means and said integrator to adjust said control signal in accordance with the signal output of said integrator, and means coupled to said adjustment means to couple said adjusted control signal to said intensity grid.

References Cited in the file of this patent

UNITED STATES PATENTS

| | | |
|---|---|---|
| 2,313,967 | Read | Mar. 16, 1943 |
| 2,399,754 | Miller | May 7, 1946 |
| 2,418,133 | Miller et al. | Apr. 1, 1947 |
| 2,860,284 | McKim | Nov. 11, 1958 |